W. A. GEIGER.
FRICTION SHOCK ABSORBING MECHANISM.
APPLICATION FILED AUG. 27, 1920.
1,386,776.
Patented Aug. 9, 1921.
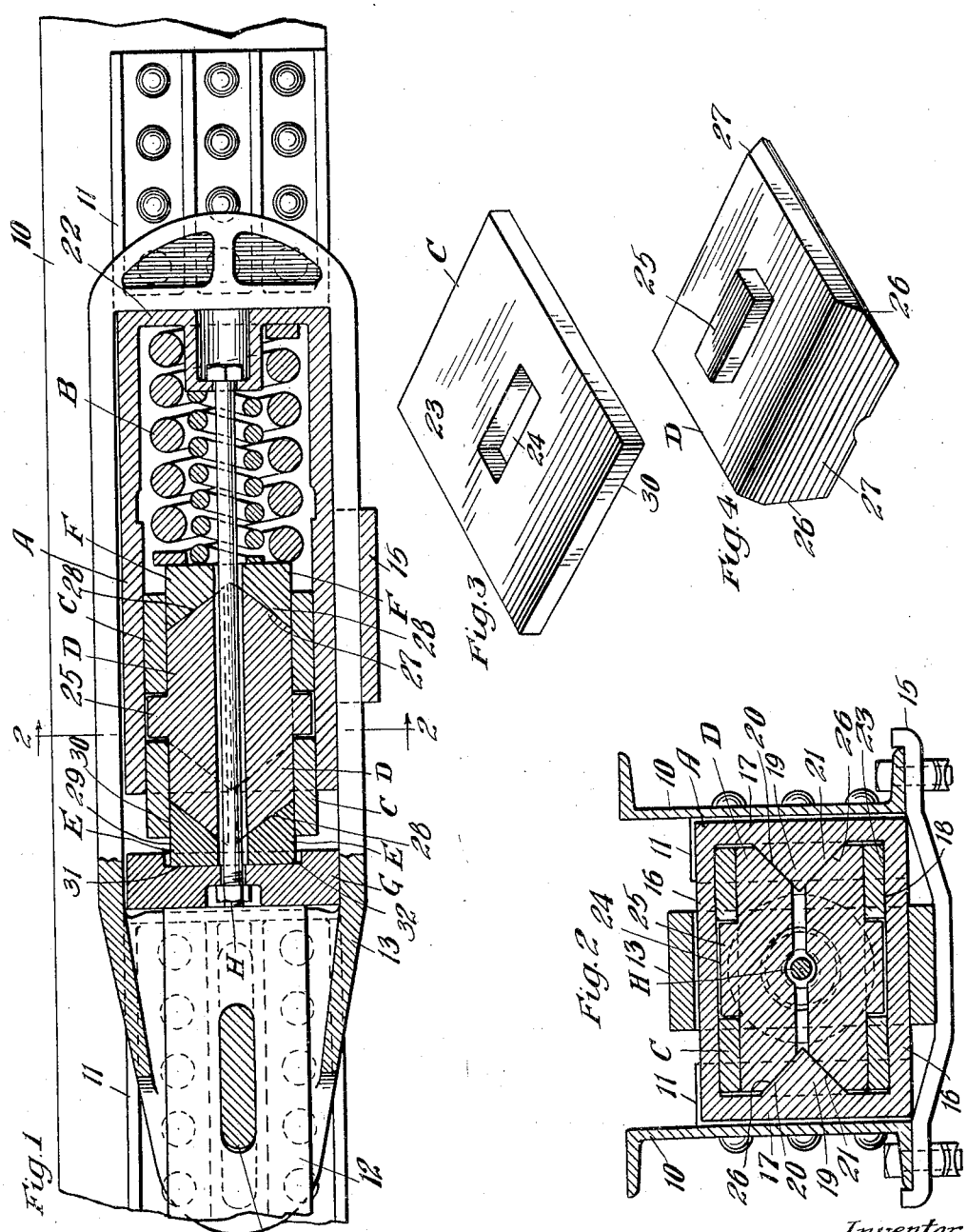
Witnesses
F. B. Townsend
Inventor
William A. Geiger
By Geo. I. Haight
His Atty

UNITED STATES PATENT OFFICE.

WILLIAM A. GEIGER, OF CHICAGO, ILLINOIS, ASSIGNOR TO WILLIAM H. MINER, OF CHAZY, NEW YORK.

FRICTION SHOCK-ABSORBING MECHANISM.

1,386,776.      Specification of Letters Patent.      Patented Aug. 9, 1921.

Application filed August 27, 1920. Serial No. 406,288.

*To all whom it may concern:*

Be it known that I, WILLIAM A. GEIGER, a citizen of United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide an efficient friction shock absorbing mechanism especially adapted for railway draft riggings and wherein are obtained high capacity, certain release, and large friction wearing areas.

In the drawing forming a part of this specification, Figure 1 is a vertical, longitudinal, sectional view of a portion of a railway draft rigging showing my improvements employed in connection therewith. Fig. 2 is a vertical, transverse, sectional view corresponding substantially to the line 2—2 of Fig. 1. And Figs. 3 and 4 are detail perspectives of two of the friction shoes employed in my construction.

In said drawing, 10—10 denote channel shaped center or draft sills of a railway car to the inner faces of which are secured front and rear stop lugs 11—11. The rear or inner portion of a drawbar is indicated at 12, the same being connected to a hooded cast yoke 13 by a key 14. The yoke and shock absorbing mechanism therewithin are supported in operative position by a detachable saddle plate 15.

The improved shock absorbing mechanism, as shown, comprises, broadly, a combined friction shell and spring cage casting A; a spring resistance B; a pair of outer friction shoes C—C; a pair of inner friction shoes D—D; a front pair of wedges E—E; a rear pair of wedges F—F; a front follower G; and a connecting and retaining bolt H.

In carrying out my invention, the casting A is formed with a friction shell at the outer or open end thereof and is made of substantially rectangular form thus providing upper and lower parallel walls 16—16 and side walls 17—17. The inner surfaces of the upper and lower walls 16 are made flat or plain and extend lengthwise and parallel to the center line of the car, the friction surfaces being indicated at 18—18. On the interior of each of the side walls 17, I provide an inwardly extended centrally located heavy rib 19 which is wedge shape in transverse section as clearly indicated in Fig. 2. Said ribs 19 are formed with upper and lower flat surfaces 20—21 intersecting each other at an angle, said surfaces 20 and 21 forming four longitudinally extending friction surfaces on the interior of the shell, as will be clear from a study of the drawing. A spring case constitutes the rear portion of the casting A, said cage having a rear integral wall 22 against which the spring B bears. The two friction shoes C—C are formed with outer flat friction surfaces 23—23 which coöperate with the friction surfaces 18. Each of the flat friction shoes C has a substantially centrally located opening 24 with which coöperates a correspondingly located lug 25 carried on the outer side of the corresponding friction shoe D. The depth of the lugs 25 will be made slightly less than the thickness of the shoes C, so that, while the corresponding sets of shoes C and D will travel in unison, back and forth, relative movement toward and from each other, that is, radially of the friction shell, is not interfered with.

Each of the friction shoes D is formed along the sides thereof with beveled or inclined friction surfaces 26—26 which coöperate with the opposed longitudinally extending friction surfaces 20 and 21 of the ribs 19. In addition, each of the friction shoes D has its ends made wedge shape or beveled as indicated at 27—27 so as to coöperate with the opposed corresponding wedge faces 28—28 of the wedges E and F.

The four wedge elements E and F are of like construction, each having a wedge face 28, above described, an outer surface 29 extending parallel to the center line of draft and adapted to engage the inner face 30 of the corresponding friction shoe C, and an end transversely disposed face 31. The two front wedges E are seated in a suitable recess 32 provided on the inner side of the follower G. The rear wedges F may bear either directly on the forward end of the spring resistance B or on a suitable follower interposed therebetween.

The shoes D and the wedges E and F are suitably cut away on their inner faces to provide the necessary clearance for the retainer bolt H which passes between the same and is adapted to connect the follower G with the casting A, to hold the parts in assembled relation and also to maintain the spring resistance B under an initial compression, if desired.

The operation is as follows, assuming an inward or buffing movement of the drawbar. As the follower G is forced inwardly or rearwardly, the wedges E tend to separate or spread the shoes C and D, forcing the shoes C tightly outwardly against the friction surfaces 18 and the shoes D tightly against the friction surfaces of the ribs 19. A similar spreading or wedging action occurs at the rear ends of the shoes C and D, due to the resistance afforded the wedges F by the spring B. As the wedges E travel inwardly, they force the shoes D in a similar direction and the latter in turn will compel the shoes C to travel inwardly because of the shouldered lug and slot engagement 25—24, therebetween. A slight amount of lost motion will preferably be provided for between the shoes C and D so as to permit of a slight movement of the shoes D in release, in advance of the shoes C.

From the preceding description considered in connection with the drawing, it will be seen that I obtain six longitudinally extending friction surfaces which provide a comparatively large wearing area and I am therefore enabled to employ relatively blunt wedging angles at all points to positively insure release. All of the friction elements are of simple formation and may be readily manufactured at comparatively small expense.

I claim:

1. In a friction shock absorbing mechanism, the conbination with a friction shell having a plurality of longitudinally extending flat friction surfaces, the planes of some of said friction surfaces being parallel with each other and the planes of the remaining friction surfaces being arranged at an angle to said parallel friction surfaces; of two sets of friction shoes, one set coöperating with said parallel friction surfaces and the other set with the other friction surfaces; spreading means interposed between the friction shoes of the two sets and adapted to press the latter against their respective coöperating shell friction surfaces; and a spring resistance.

2. In a friction shock absorbing mechanism, the combination with a friction shell having a plurality of longitudinally extending flat friction surfaces, the planes of some of said friction surfaces being parallel with each other and the planes of the remaining friction surfaces being arranged at an angle to said parallel friction surfaces; of two sets of friction shoes, one set coöperable with said parallel friction surfaces and the other set with the other friction surfaces; spreader means arranged at each end of the two sets of friction shoes and adapted to press the latter against their respective coöperating shell friction surfaces; and a spring resistance to yieldingly resist relative movement between the shoes and shell.

3. In a friction shock absorbing mechanism, the combination with a friction shell having opposed longitudinally extending friction surfaces and inwardly directed longitudinally extending ribs on the interior thereof, said ribs being wedge shape in cross section; of friction shoes coöperable with said ribs; friction shoes coöperable with said friction surfaces; wedge-acting means coöperable with all of said friction shoes; and spring means affording a yieldable resistance to relative movement between the shoes and shell.

4. In a friction shock absorbing mechanism, the combination with a friction shell having opposed interior longitudinally extending friction surfaces and opposed inwardly directed longitudinally extending ribs on the inner side thereof, said ribs being wedge shape in cross section; of friction shoes coöperable with the surfaces of said ribs; friction shoes coöperable with said first named friction surfaces; wedging means disposed at the opposite ends of said shoes and coöperable therewith; and spring means affording a yieldable resistance to relative movement between the shoes and shell.

5. As an article of manufacture, a friction shell for friction shock absorbing mechanisms, said shell being of substantially rectangular cross section, two opposed walls of said shell having friction surfaces on the interior thereof and the other two walls of the shell being formed on the interior thereof with integral longitudinally extending ribs of substantially wedge formation in section.

6. In a friction shock absorbing mechanism, the combination with a friction shell of substantially rectangular cross section, said shell having friction surfaces formed on the interior of two opposed sides and provided also with additional longitudinally extending friction surfaces on the remaining two sides thereof; of a set of friction shoes coöperable with the first named friction surfaces and another set of friction shoes coöperable with said additional friction surfaces, one of said sets of friction shoes having wedge shaped ends; wedges coöperable with said wedge shaped ends and also with the other friction shoes; and a spring resistance for yieldingly resisting relative movement between the shoes and shell.

7. In a friction shock absorbing mechanism, the combination with a friction shell of substantially rectangular cross section, said shell having friction surfaces formed on the interior of two opposed sides and provided also with additional longitudinally extending friction surfaces on the remaining two sides thereof; of a set of friction shoes coöperable with the first named friction surfaces and another set of friction shoes coöperable with said additional friction surfaces, one of said sets of friction shoes having wedge shaped ends; wedges coöperable with said wedge shaped ends and also with the other friction shoes; a spring resistance for yieldingly resisting relative movement between the shoes and shell; and coöperating means on the two sets of friction shoes locking the same to move simultaneously lengthwise of the shell.

8. In a friction shock absorbing mechanism, the combination with a casting having a friction shell and a spring cage, the friction shell being of substantially rectangular cross section and provided with interior opposed parallel friction surfaces on two sides of the shell and opposed wedge shaped ribs on the inner faces of the two remaining sides of the shell; of a spring resistance within the spring cage; a pair of friction shoes having longitudinally extending friction surfaces near their edges coöperable with said ribs, said shoes having their ends wedge shape; a pair of outer friction shoes coöperable with the first named friction surfaces of the shell; means for interlocking the two sets of friction shoes to move simultaneously; and a plurality of wedges at each end of the friction shoes arranged to press the inner shoes inwardly and the outer shoes outwardly during the compressive action.

In witness that I claim the foregoing I have hereunto subscribed my name this 18th day of Aug., 1920.

WILLIAM A. GEIGER.

Witness:
CARRIE GAILING.